No. 721,093. PATENTED FEB. 17, 1903.
C. C. RIOTTE.
SPEED CHANGING AND REVERSING MECHANISM.
APPLICATION FILED JAN. 9, 1902.
NO MODEL. 2 SHEETS—SHEET 1.
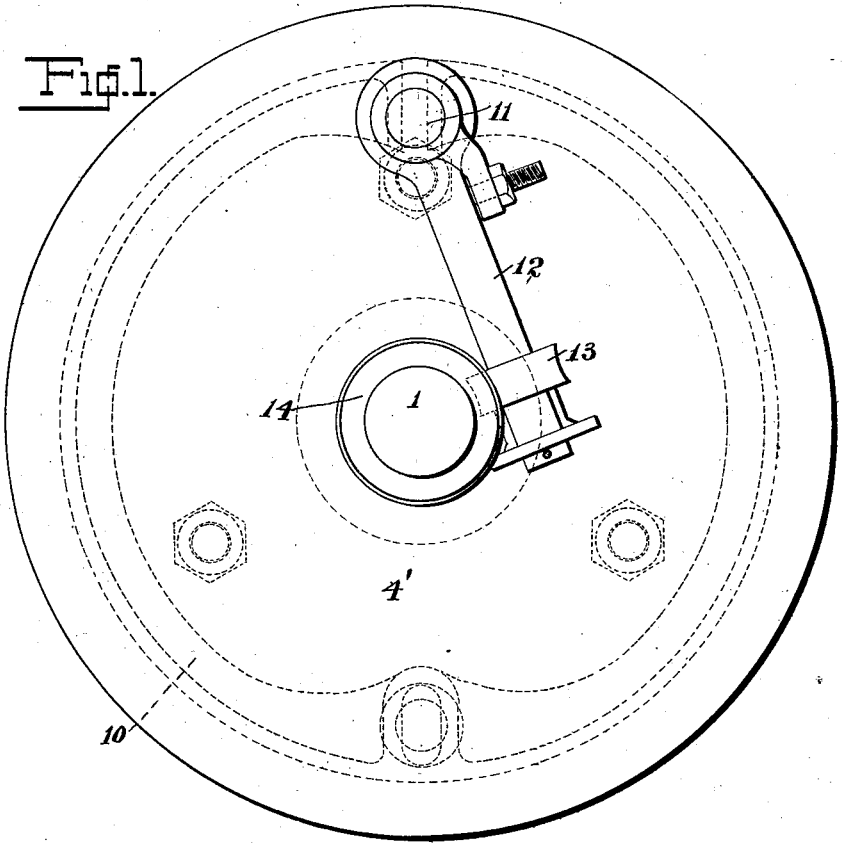
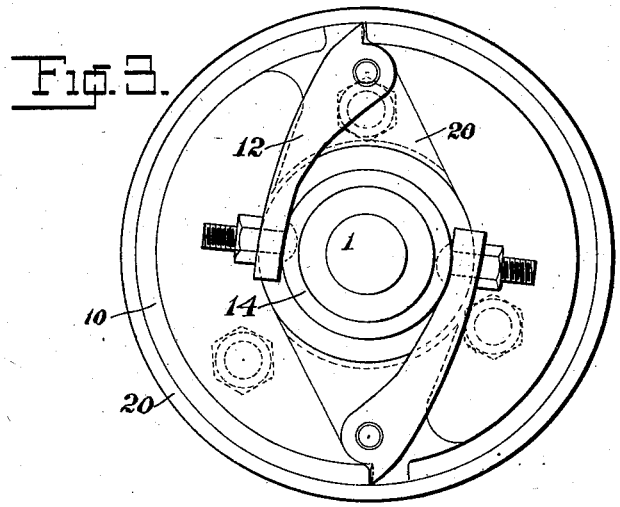
Witnesses
Inventor:

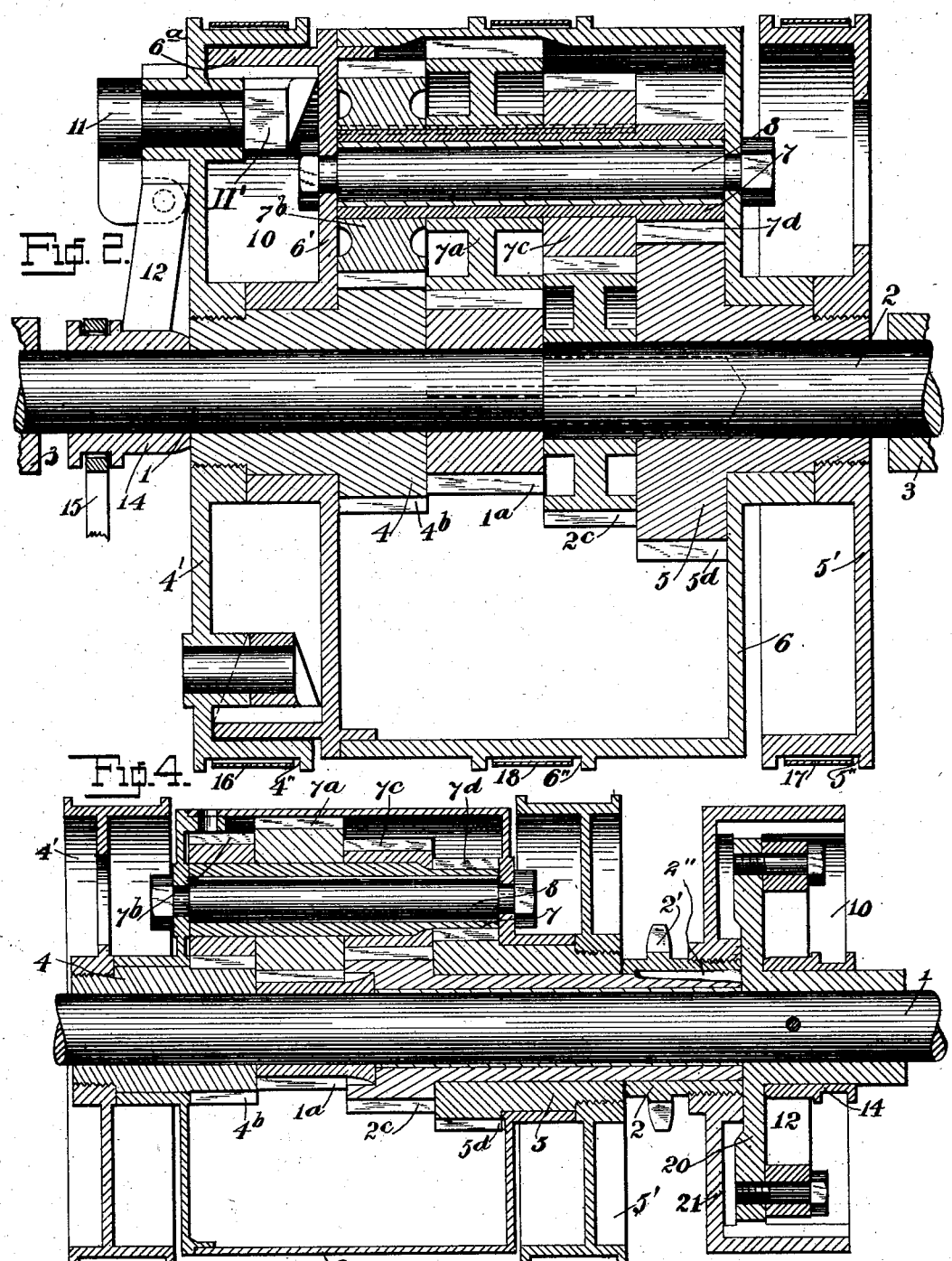

UNITED STATES PATENT OFFICE.

CARL C. RIOTTE, OF NEW YORK, N. Y., ASSIGNOR TO THE UNITED STATES LONG DISTANCE AUTOMOBILE COMPANY, OF JERSEY CITY, NEW JERSEY, A CORPORATION OF NEW JERSEY.

SPEED CHANGING AND REVERSING MECHANISM.

SPECIFICATION forming part of Letters Patent No. 721,093, dated February 17, 1903.

Application filed January 9, 1902. Serial No. 89,007. (No model.)

*To all whom it may concern:*

Be it known that I, CARL C. RIOTTE, a citizen of the United States, residing at New York, in the county and State of New York, have invented certain new and useful Improvements in Speed Changing and Reversing Mechanism, of which the following is a specification.

This invention relates to improvements in speed changing and reversing mechanisms; and its object is to enable the transmission of power at a plurality of speeds and with capacity of reversal and of disconnection when desired.

My invention comprises a driving member, a driven member, and a plurality of intermediate devices gearing with the driving and driven members and movable rotatively thereon, and means for holding any of said devices from rotation or to clutch the devices together to give variations in speed and direction of movement or to disconnect the driving and driven members.

In the accompanying drawings, Figure 1 is an end elevation, and Fig. 2 is a longitudinal section, of a mechanism embodying my invention. Figs. 3 and 4 are similar views of a modified form of the invention.

Referring to Figs. 1 and 2, the driving shaft or member is indicated at 1 and the driven shaft or member at 2, these shafts being journaled in line with one another in bearings 3 and adapted to rotate freely independently of each other except as controlled by the gearing, hereinafter described. Stepped power-transmitting sleeves 4 5 are rotatably supported on shafts 1 and 2, respectively, and a casing, drum, or gear-carrying device 6, which is journaled to turn freely on both of said sleeves, carries one or more intermediate shafts 7, journaled in box 6 eccentrically to the shafts 1 2. These intermediate shafts 7 may, as indicated, be hollow shafts or sleeves turning freely on bolts or arbors 8, that extend longitudinally across the box or drum 6 and rigidly connect the portions 6 6' thereof. Each intermediate shaft or sleeve 7 carries or has rigidly mounted upon it a plurality of spur-gears $7^a$ $7^b$ $7^c$ $7^d$, intermeshing, respectively, with spur-gears $1^a$ $4^b$ $2^c$ $5^d$, rigidly mounted on shaft 1, sleeve 4, shaft 2, and sleeve 5, respectively. The gears $7^a$ and the gear $1^a$ constitute a set of engaging gears; gears $7^b$ and gear $4^b$, a second set; gears $7^c$ and gear $2^c$, a third set, and gears $7^d$ and gear $5^d$ a fourth set, each of these sets of gears being planetary—that is, having the member or members $7^a$ $7^b$ $7^c$ $7^d$ mounted to revolve around the other members $1^a$ $4^b$ $2^c$ $5^d$. Gear $1^a$ is connected to the driving member or shaft 1 and gear $2^c$ to the driven member or shaft 2, while the remaining gears $4^b$ $5^d$ are integral with or secured to the sleeves 4 and 5, respectively, which are loosely mounted to rotate on the shafts 1 and 2, respectively, and hence gears $4^b$ $5^d$ rotate on the same axis with gears $1^a$ and $2^c$. As stated above, the drum 6 may carry one or more intermediate shafts 7, having spur-gears $7^a$, $7^b$, $7^c$, and $7^d$, intermeshing with the gears carried by the main shafts and sleeves. These shafts 7 and their intermediate spur-gears would be arranged diametrically opposite in the drum 6 when two sets of intermediate shafts and gears are employed, and when more than two sets of intermediate shafts and gears are employed they will be arranged at equal distances apart circumferentially. The purpose of such arrangement is to properly balance the drum 6 upon its bearings. To the loose sleeve 4 is rigidly secured a drum or wheel 4', which carries clutching devices whereby it may be caused to engage with the projecting end rim 6' of drum or box 6. Such clutching means is shown as consisting of a split ring 10, tending to spring into closed position, in which it is free of the flange $6^a$ of box-head 6', a rock-shaft 11, having a cam portion 11' engaging between the ends of split ring 10, a lever 12, pivotally connected to the shaft 11 and having a roller 13, and a loose cam-hub 14 on shaft 1 adapted to engage said roller, said cam-hub being operated by a lever or bar 15, engaging in an annular groove therein, so that endwise movement of said cam-hub on shaft 1 will expand the ring 10 or allow it to contract and will accordingly tighten or loosen its engagement with the flange $6^a$. Another wheel or drum 5' is rigidly secured to the other sleeve 5. Each of the members 4', 5', and 6 has a peripheral portion 4'', 5'', and 6'', adapted to receive a suitable brake-strap or clutch 16, 17, or 18 to enable the movement of any one of these parts to be arrested. These straps are tightened by any usual or suitable means. It will be observed that since drums 4' and 5' are rigidly mounted upon sleeves 4 and 5, respectively, and gears $4^b$ and $5^d$ are integral with sleeves 4 and 5, respectively, the gears $4^b$ and $5^d$ are fixed to drums 4' and 5', respectively. Gears $1^a$ and $2^c$ are keyed, respectively, on shafts 1 and 2 and are so proportioned to the engaging gears $7^a$ and $7^c$ as to give a speed-reducing effect through the train of gearing $1^a$ $7^a$ $7^c$ $2^c$. Gears $4^b$ and $5^d$ are formed integrally with or secured to sleeves 4 and 5, the gear $4^b$ being smaller than the gear $2^c$. Gear $5^d$ on the sleeve 5 engages gear $7^d$ on shaft 7 and is larger than gear $2^c$. The sets of gears $5^d$ $7^d$ and $4^b$ $7^b$ have gear ratios that are reversely conditioned as regards their relation to the gearing connecting the shaft 7 with the driven member 2, so that said member will be driven in one or the other direction, according to which of the members 5 or 4 is controlling same. The mechanism is brought under control of one or the other of these gear devices by arrest of one or the other of the members 4 5, which thus act as controlling members.

The operation of the device is as follows: When the clutch 10 6' is open and all the straps 16 17 18 are loose, so that the members 4', 5', and 6 can all turn freely, the rotation of shaft 7 will result only in an idle rotation of one or more of these members without transmitting power or movement to shaft 2, this being the disengaged or unclutched position. For rotation "ahead" at highest speed the clutch 10 6' is closed or engaged, and the box 6 is thereby forced to rotate with wheel or member 4', and therefore with sleeve 4 and gear $4^b$. The engagement of gear $4^b$ and $7^b$ then locks the shaft 7, so that it is kept from rotation on its axis, but revolves around the axis of shafts 1 2. As gear $7^c$ on this shaft must revolve in the same manner, it will turn gear $2^c$ and substantially lock the shafts 1 and 2 together, so that they will revolve at the same speed. To go ahead at medium speed, the clutch 10 6' is opened and the member 6 is held by strap 18, so that shaft 7 is held in fixed position and can move only by rotation on its own axis. The train of gears $1^a$ $7^a$ $7^c$ $2^c$ then drives shaft 2 at a slower speed than shaft 1. For slower speed in the same direction clutch 10 6' and straps 16 18 are released and strap 17 is tightened to hold member 5' and sleeve 5 from rotation. Gear $5^d$ being thus held stationary, the gear $7^d$ on shaft 7 is forced to roll around it in planetary manner, and owing to the difference in gear ratio between the pairs of gears $5^d$ $7^d$ and $2^c$ $7^c$ the shaft 2 is turned at a slow rate of speed by a differential effect, the gear $7^d$ not moving the shaft 7 backward quite fast enough to compensate for the forward drive from that shaft to shaft 2. To reverse, the clutch device 16 only is engaged, whereupon the gear $7^b$ will roll on gear $4^b$, now held stationary, the relation of gears $4^b$ $7^b$ and $7^c$ $2^c$ being such that shaft 7 is allowed to move backward faster than will compensate for the forward drive from that shaft to shaft 2, with the result that said shaft 2 is driven in a reverse direction to the movements above described and at a slow speed.

The device may be modified in various ways without departing from the essence of my invention. For example, instead of the driving and driven members being in the form of shafts in alinement with each other, as shown in Fig. 2, the driven member 2 may consist of a sleeve or wheel mounted to rotate on the driving-shaft 1, as in the form shown in Figs. 3 and 4, the member 2 being here shown as a sleeve carrying a sprocket-wheel 2', (locked thereto by a key 2",) from which power may be transmitted by chain to other parts. In this construction, moreover, the clutch 10 is adapted to connect the shafts 1 and 2 directly without recourse to the expedient of locking the gears, as in Figs. 1 and 2, the clutch 10 in the form shown in Figs. 3 and 4 being carried by a frame 20, fast on shaft 1 and engaging a flanged disk or wheel 21, fast on the driven sleeve 2. The construction and operation of the other parts are substantially the same as in the form shown in Figs. 1 and 2, and the several effects of change of speed and of reversal are obtained substantially as above described.

Having thus described my invention, the following is what I claim as new therein and desire to secure by Letters Patent:

1. A speed-changing mechanism comprising a plurality of gears mounted to rotate around a common axis, driving means connected to one of said gears, driven means connected to another of said gears, the remaining gears being loosely mounted with respect to both the driving and the driven means, a supporting means mounted to rotate about the axis of the aforesaid gears, rigidly-connected gears mounted to turn on said supporting means and to engage with the aforesaid gears, means for arresting the movement of any one of the loosely-mounted gears, and means for holding the said supporting means from rotation.

2. A speed-changing mechanism comprising a plurality of gears mounted to rotate around a common axis, driving means connected to one of said gears, driven means connected to another of said gears, the remaining gears being loosely mounted with respect to both the driving and the driven means, a supporting means mounted to rotate about the axis of the aforesaid gears, rigidly-connected gears mounted to turn in said supporting means and to engage with the aforesaid gears, and means for arresting the movement of either one of the aforesaid loosely-mounted gears.

3. A speed-changing mechanism comprising a plurality of gears mounted to rotate around a common axis, driving means connected to one of said gears, driven means connected to another of said gears, the remaining gears being loosely mounted with respect to both the driving and the driven means, a supporting means mounted to rotate about the axis of the aforesaid gears, rigidly-connected gears mounted to turn in said supporting means and to engage with the aforesaid gears, means for clutching one of the loosely-mounted gears to the movable supporting means, and means for controlling the movement of the other loosely-mounted gear or gears.

4. A speed-changing mechanism comprising a plurality of gears mounted to rotate around a common axis, driving means connected to one of said gears, driven means connected to another of said gears, the remaining gears being loosely mounted with respect to both the driving and the driven means, a supporting means mounted to rotate about the axis of the aforesaid gears, rigidly-connected gears mounted to turn in said supporting means and to engage with the aforesaid gears, means for holding the movable supporting means from rotation, and means for holding any one of said loosely-mounted gears from rotation, the engaging gears comprising said loosely-mounted gears having different gear ratios.

5. A speed-changing mechanism comprising a plurality of gears mounted to rotate around a common axis, driving means connected to one of said gears, driven means connected to another of said gears, the remaining gears being loosely mounted with respect to both the driving and the driven means, a supporting means mounted to rotate about the axis of the aforesaid gears, rigidly-connected gears mounted to turn in said supporting means and to engage with the aforesaid gears, means for holding the movable supporting means from rotation, means for holding any one of said loosely-mounted gears from rotation, and means for clutching one of the loosely-mounted gears to the movable supporting means, the engaging gears comprising said loosely-mounted gears having different gear ratios.

6. A speed-reversing mechanism comprising a plurality of sets of planetary gears having different gear ratios, two of the sets of engaging gears having gear ratios reversely conditioned with respect to the gear connection to the driven member, and means whereby one member of one or the other of such sets of gears may be held from rotation.

7. A speed-changing mechanism comprising driving and driven members, a planetary shaft and rotatable supporting means for same whereby said shaft is movable planetarily around the driving and driven members, two controlling members rotatable on the axis of the driving and driven members, gears on the planetary shaft, and gears engaging therewith on the driving and driven members and on the controlling members, the gears for the two controlling members having different gear ratios, and means for holding either of said controlling members from rotation.

8. A speed-changing mechanism comprising driving and driven members, a planetary shaft and rotatable supporting means for same whereby said shaft is movable planetarily around the driving and driven members, two controlling members rotatable on the axis of the driving and driven members, gears on the planetary shaft, and gears engaging therewith on the driving and driven members and on the controlling members, the gears for the two controlling members having different gear ratios and means for holding either of said controlling members or the rotatable supporting means for the planetary shaft from rotation.

9. A speed changing and reversing mechanism comprising driving and driven members, a planetary shaft and rotatable supporting means therefor, two controlling members rotatable on the axis of the driving and driven members, gears on the planetary shaft and gears engaging therewith on the driving and driven members and on the controlling members, the gears for the controlling members having gear ratios reversely conditioned relatively to the gear connection to the driven member and means for holding either of said controlling members from rotation.

10. A speed changing and reversing mechanism comprising driving and driven members, a planetary shaft and rotatable supporting means therefor, two controlling members rotatable on the axis of the driving and driven members, gears on the planetary shaft and gears engaging therewith on the driving and driven members and on the controlling members, the gears for the controlling members having gear ratios reversely conditioned relatively to the gear connection to the driven member and means for holding either of said controlling members or the rotatable supporting means for the planetary shaft from rotation.

11. A speed-changing mechanism comprising driving and driven members, a shaft and a rotatable means in which it is mounted to move planetarily around the axis of said members and to turn on its own axis, a rotatable controlling member, gears on the planetary shaft and gears engaging therewith on the driving and driven members and on the controlling member, means for clutching said controlling member to the rotatable supporting means for the planetary shaft, and means for holding the said controlling member from rotation.

12. The combination of the driving and driven members, two sleeves mounted to rotate around the axis of said members, a casing rotatable on said sleeves, a shaft journaled in said casing and movable planetarily with regard to the driving and driven members, gears on said shaft and gears engaging therewith on the driving and driven members, and on said sleeves, and means for holding either of said sleeves or said casing from rotation.

13. The combination of the driving and driven members, two sleeves mounted to rotate around the axis of said members, a casing rotatable on said sleeves, a shaft journaled in said casing and movable planetarily with regard to the driving and driven members, gears on said shaft and gears engaging therewith on the driving and driven members and on said sleeves, means for clutching one of said sleeves to the casing, and means for holding either of said sleeves or said casing from rotation.

CARL C. RIOTTE.

Witnesses:
J. GREEN,
A. P. KNIGHT.